(12) United States Patent
Blair et al.

(10) Patent No.: US 12,358,411 B2
(45) Date of Patent: Jul. 15, 2025

(54) VEHICLE SEAT SUBASSEMBLIES

(71) Applicant: Lear Corporation, Southfield, MI (US)

(72) Inventors: Samuel Blair, Troy, MI (US); Joshua Hallock, Warren, MI (US); David Abdella, Royal Oak, MI (US); Ashley Baisch, Washington Township, MI (US)

(73) Assignee: Lear Corporation, Southfield, MI (US)

( * ) Notice: Subject to any disclaimer, the term of this patent is extended or adjusted under 35 U.S.C. 154(b) by 68 days.

(21) Appl. No.: 17/711,802

(22) Filed: Apr. 1, 2022

(65) Prior Publication Data

US 2023/0311729 A1 Oct. 5, 2023

(51) Int. Cl.
*B60N 2/90* (2018.01)
*B60N 2/42* (2006.01)
*B60N 2/427* (2006.01)
*B60N 2/66* (2006.01)
*B60N 2/888* (2018.01)

(52) U.S. Cl.
CPC ........... *B60N 2/976* (2018.02); *B60N 2/4228* (2013.01); *B60N 2/42781* (2013.01); *B60N 2/6671* (2015.04); *B60N 2/6673* (2015.04); *B60N 2/888* (2018.02); *B60N 2/914* (2018.02)

(58) Field of Classification Search
CPC ........ B60N 2/976; B60N 2/665; B60N 2/914; B60N 2/6673
See application file for complete search history.

(56) References Cited

U.S. PATENT DOCUMENTS

| | | | |
|---|---|---|---|
| 5,975,629 A | 11/1999 | Lorbiecki | |
| 7,874,616 B2 | 1/2011 | D'Agostini | |
| 8,777,320 B2 | 7/2014 | Stoll et al. | |
| 10,160,356 B2* | 12/2018 | Lofy | B60N 2/5692 |
| 10,696,202 B2* | 6/2020 | Sedenka | B60N 2/7017 |
| 10,752,145 B2 | 8/2020 | Steinberger et al. | |
| 10,793,041 B2 | 10/2020 | Steinberger et al. | |
| 11,065,991 B2 | 7/2021 | Iacovone et al. | |
| 2010/0244504 A1* | 9/2010 | Colja | A61H 9/0078 297/284.6 |
| 2016/0129920 A1* | 5/2016 | Hall | B60N 2/665 701/1 |
| 2018/0177675 A1* | 6/2018 | Osgood | B60N 2/665 |
| 2020/0215765 A1 | 7/2020 | Murmann et al. | |

FOREIGN PATENT DOCUMENTS

| | | |
|---|---|---|
| DE | 102011122124 A1 | 7/2012 |
| DE | 102019219675 A1 | 6/2021 |
| DE | 102017221150 B4 | 7/2021 |
| WO | 2004026623 A1 | 4/2004 |

* cited by examiner

*Primary Examiner* — David R Dunn
*Assistant Examiner* — Tania Abraham
(74) *Attorney, Agent, or Firm* — Carlson, Gaskey & Olds, P.C.

(57) ABSTRACT

Seat assemblies and subassemblies are disclosed. The subassemblies include massage and/or ventilation subassemblies that employ tubeless air distribution by fixing sheets together such as by heat-staking. The subassemblies also include a support structure for preassembling the massage, ventilation, and/or electronic components together prior to suspending them in a seat assembly.

24 Claims, 3 Drawing Sheets

VEHICLE SEAT SUBASSEMBLIES

TECHNICAL FIELD

The present disclosure relates to ventilation and/or massage assemblies/subassemblies such as for a vehicle seat assembly.

BACKGROUND

Seat assemblies and subassemblies are disclosed in U.S. Pat. No. 7,874,616 which issued to Lear Corporation on Jan. 25, 2011.

SUMMARY

A massage and/or ventilation subassembly is disclosed. The subassembly includes a first sheet fixed to a second sheet such that a plurality of inflatable passages is defined. Each passages may be in fluid communication with a compartment via an orifice in the first or second sheet. The compartment may be defined by a bladder fixed to the first or second sheet. The passages may include a first end terminating at the orifice and a second end configured to receive a fluid flow from a valve assembly or pump during operation.

In one or more embodiments, the first and second sheets may define a ventilation channel.

In a variation, the first sheet may form a portion of a first ventilation bag and the second sheet may form a portion of a second ventilation bag. The first portion of the first ventilation bag may define a first aperture aligned with the ventilation channel and the second portion of the second ventilation bag may define a second aperture aligned with the first aperture such that there may be fluid communication between the apertures. The first ventilation bag may also define one or more outlet orifices for providing ventilation to an occupant and the second ventilation bag may define an inlet configured to receive an airflow from a blower. During operation the blower may provide an airflow that travels into the inlet, through the second ventilation bag, out the second aperture, into the first aperture, through the first ventilation bag, and to an occupant through the one or more outlet orifices.

In one or more embodiments, the ventilation channel may house a ventilation bag having an inlet configured to receive an airflow from a blower and one or more orifices such that the blower may provide ventilation to an occupant during operation.

In a refinement, the bladder may be formed by one or more additional sheets fixed to the first or second sheet.

A seat assembly is also disclosed. The seat assembly may include a seat frame and the massage and/or ventilation subassembly supported by the seat frame.

A vehicle seat subassembly is also disclosed. The vehicle seat assembly includes a support structure, a blower, and an inflatable massage subassembly. The support structure may include a first side and second side opposite the first side. The blower may be attached to the first side and includes a housing with a portion of the housing is formed by the support structure. The blower may be configured to provide ventilation to an occupant during operation. The inflatable massage subassembly may be attached to the second side of the support structure.

In a variation, a pump with a second housing may also be attached to the support structure such that the support structure may form a portion of the second housing. The pump may be configured to inflate one or more bladders of the inflatable massage subassembly during operation.

In one or more embodiments, a valve assembly with a third housing may be attached to the support structure such that the support structure may form a portion of the third housing. The valve assembly may coordinate an airflow from a pump to different components such as the bladders to provide a massaging effect during operation.

In a refinement, the various housings may each include a segment that is connected to the support structure by a retainer such as a snap-fit retainer.

In some refinements, the one or more bladders may each comprise a sidewall defining an inflatable compartment. A first sheet may form at least a portion of the sidewall. The first sheet may be connected to a second sheet such that the first and second sheets define a ventilation channel.

In one or more embodiments, the support structure may be configured to support a plurality of suspension systems. The suspension systems may be used to suspend the massage subassemblies in seat assemblies.

In another variation, the first housing may also house a pump and a valve assembly.

A vehicle seat assembly is disclosed. The vehicle seat assembly includes a seat frame and the vehicle seat subassembly supported by the seat frame.

A massage subassembly is disclosed. The subassembly includes a first sheet and a second sheet configured to define an inflatable air passage. The inflatable air passage may include a first end configured to receive an airflow during operation through, for example, a valve assembly and a second end terminating at an orifice in the second sheet. The orifice may be in pneumatic communication with an inflatable compartment defined by a third sheet attached to the second sheet around the orifice.

A vehicle seat assembly is disclosed. The seat assembly includes a seat frame and the massage subassembly supported by the seat frame.

In a variation, the massage subassembly may include a fourth sheet such that the third and fourth sheets are configured to define an additional inflatable compartment.

In another variation, the massage subassembly may include a fifth sheet such that the fourth and fifth sheets are configured to define an additional inflatable passage in pneumatic communication with the additional inflatable compartment. Pneumatic communication may be provided by an additional orifice in the fourth sheet.

The inflatable air passage may be one of a plurality of inflatable air passage defined by the first and second sheets. Each passage may be in pneumatic communication with a corresponding compartment.

The massage subassembly may also include an additional inflatable air passage from the plurality of passages. The additional air passage may be in pneumatic communication with a compartment defined by the first sheet and a fourth sheet. Pneumatic communication may be provided by an orifice in the first sheet.

DETAILED DESCRIPTION

Figure 1A:
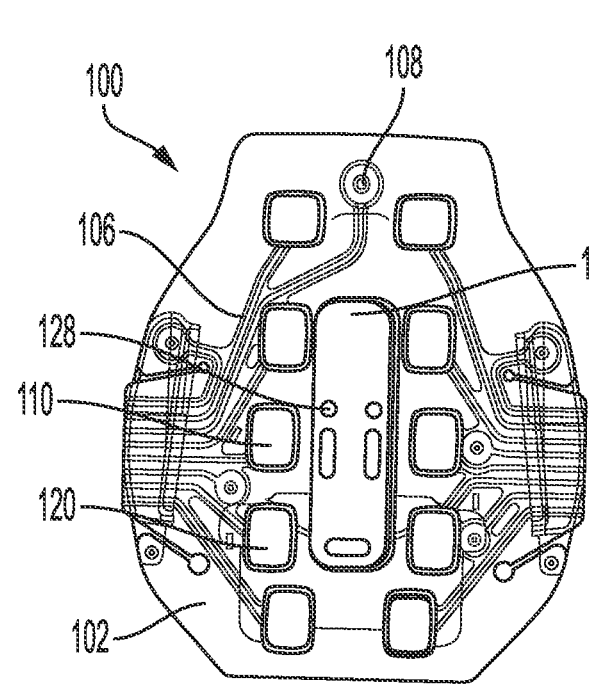
FIG. 1A is a first side of a massage subassembly according to an embodiment.

Embodiments of the present disclosure are described herein. It is to be understood, however, that the disclosed embodiments are merely examples and other embodiments can take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art to variously employ the embodiments of the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Moreover, except where otherwise expressly indicated, all numerical quantities in this disclosure are to be understood as modified by the word "about" in describing the broader scope of this disclosure. Practice within the numerical limits stated is generally preferred. Also, unless expressly stated to the contrary: percent, "parts of," and ratio values are by weight; the term "polymer" includes "oligomer," "copolymer," "terpolymer," and the like; the description of a group or class of materials as suitable or preferred for given purpose implies the mixtures of any two or more of the members of the group or class are equally suitable or preferred; molecular weights provided for any polymers refers to number average molecular weight; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

This disclosure is not limited to the specific embodiments and methods described below, as specific components and/or conditions may vary. Furthermore, the terminology used herein is used only for the purpose of describing particular embodiments and is not intended to be limiting in any way.

The term "substantially" or "generally" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4 . . . 97, 98, 99, 100. Similarly, when any range is called for, intervening numbers that are increments of the difference between the upper limit and the lower limit divided by 10 can be taken as alternative upper or lower limits. For example, if the range is 1.1 to 2.1 the following numbers 1.2, 1.3, 1.4, 1.5, 1.6, 1.7, 1.8, 1.9, and 2.0 can be selected as lower or upper limits.

Figure 1B:
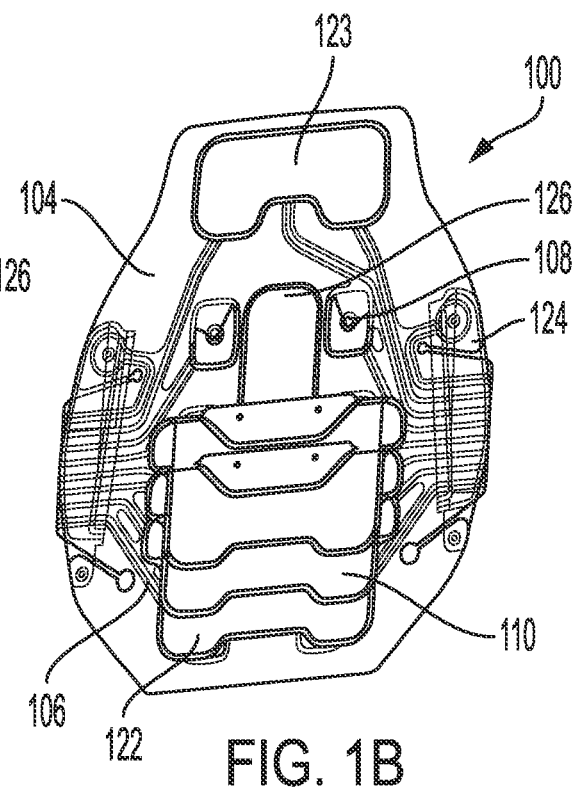
FIG. 1B is a second side opposite the first side of the massage subassembly.
Figure 4:
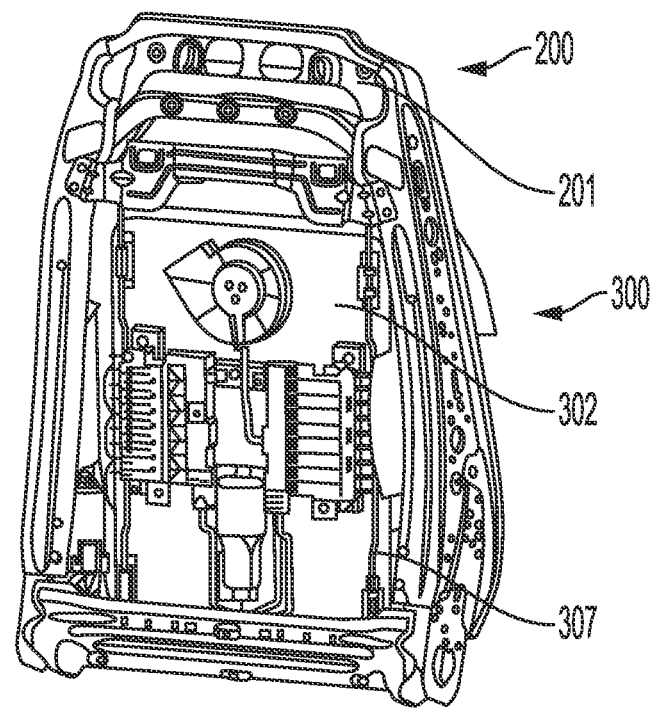
FIG. 4 is a seat back assembly.

A massage and/or ventilation subassembly 100 is disclosed as shown in FIGS. 1A-B. The massage subassembly 100 may be supported in a seat assembly 200 by a seat frame 201, as shown in FIG. 4. The seat assembly 200 may be a vehicle seat assembly such as in a motorcycle, automobile, train, watercraft, or aircraft. The massage subassembly 100 includes a first sheet 102 fixed to a second sheet 104 such that the sheets 102, 104 define a passage 107 (FIGS. 1C and 1D) or a plurality of passages 106. The passages 106 may connect various components such as bladders, flow inducing devices, valves, haptic devices, or a combination thereof.

The sheets 102, 104 may be made of a material that is impermeable to a fluid such as air. For example, the sheets may be made of an organic polymeric material (i.e., plastic) such as polyethylene, polypropylene, polyvinyl chloride, polyurethane, acrylic, polycarbonate, or combinations thereof. The sheets may be thermoplastic or thermoset polymer. For example, the sheets may be thermoplastic polyurethane. The shapes and size of the sheets 102, 104 may be any suitable size for fitting in a vehicle seat. In a variation, the shape and size may be suitable for providing a massaging effect to a human body such as a human back and/or neck. In a refinement, the shape and size of the first and second sheets are substantially similar or the same. The plastic sheet may have a thickness of less than 5 mm, or more preferably less than 1, or even more preferably less than 0.5 mm. In a variation, the thickness may be 0.01 to 5 mm, or more preferably 0.1 to 1 mm, or even more preferably 0.2 to 0.5 mm. The sheets 102, 104 are fixed to one another such that they define the plurality of passages 106. The sheets 102, 104 may be fixed by heat-staking, ultrasonic staking, hot-plate welding, heat swaging, cold pressing, or the like. Heat-staking, for example, may form localized bonding between the two sheets 102, 104 that form a seal. In a refinement, the sheets 102, 104 may be fixed by heat-staking along the perimeter of the passages 106 forming a continuous heat-staked line. The seal allows the passages 106 to be inflated when an airflow passes through the passages 106 above a threshold pressure. The continuous heat-staked lines thus outline the plurality of passages 106 while fixing the first and second sheets 102, 104 to one another.

Figure 1C:
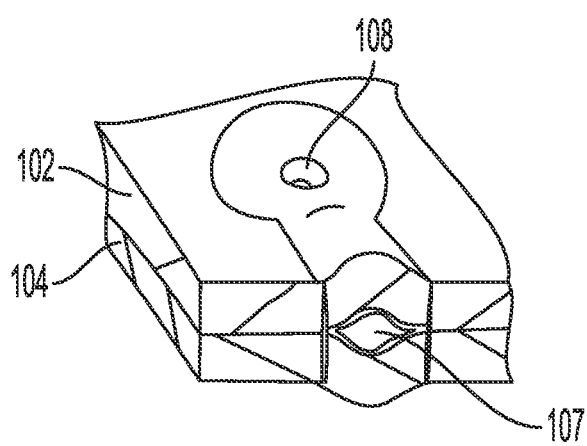
FIG. 1C is a partial perspective, cross-sectional view of a portion of an inflatable passage defined by a first and a second sheet.
Figure 1D:
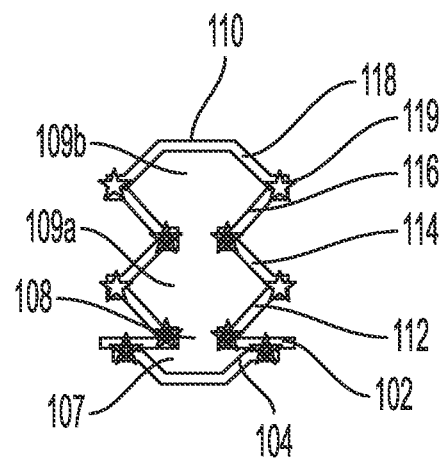
FIG. 1D is a schematic cross-sectional view of a bladder fixed to the first or second sheet according to an embodiment.

Each of the plurality of passages 106 may define an orifice 108 at a first end, as shown in FIG. 1C. The orifice 108 may be defined by the first or second sheet 102/104. The orifice 108 provides fluid communication (e.g., pneumatic communication) with a compartment 109. The compartment 109 may be defined by the sidewall of an inflatable bladder 110. The bladder 110 may be fixed to the first or second sheet 102/104 around the orifice 108 as described herein, as shown in FIG. 1D. In a refinement, the bladder 110 may fixed via heat staking. The bladder 110 may define one or more compartments. In a refinement, the bladder 110 may define a plurality of compartments. For example, the bladder 110 may define a first compartment 109a and a second compartment 109b. Each inflatable bladder 110 may be formed by one or more additional sheets. For example, the bladder 110 may be formed by a third sheet fixed to the first or second sheet 102/104. In a variation, a fourth sheet may be fixed to the first sheet 102 to form one or more bladders. In a refinement, the bladder 110 may be formed by a third and a fourth sheet fixed to one another and fixed to the first or second sheet 102/104. In another refinement, a fifth sheet may form an additional inflatable passage with, for example a fourth sheet. The additional passage may be in fluid communication with an additional bladder formed by the third and fourth sheets via an orifice in the fourth sheet. In yet another refinement, the bladder 110 may be formed by four additional sheets 112, 114, 116, 118 heat staked 119 to one another, as shown in FIG. 1D. The bladders 110 may be of various shapes and sizes. The bladder 110 may have a multi-compartment (i.e., bellows) or hourglass like shape, as shown in FIG. 1D such that it extends further from the orifice 108 than a single compartment bladder 110 when inflated. Referring again to FIGS. 1A-B, the bladders may, for example, include rectangular bladders 120, lumbar bladders 122, shoulder support bladder 123, bolster bladders 124, or a combination thereof may be used. Between any of the sheets, within the inflatable compartments and/or passages a porous fabric or filament spacer may be disposed to prevent collapse. In other words, the spacer provides a structure that supports air movement even when subassembly 100 is crushed under the pressure of an occupant 210.

There may be 1 to 30, or more preferably 5 to 25, or even more preferably 10 to 20 passages 106 and/or bladders. For example, the plurality of passages 106 may include 15 passages in fluid communication with 15 bladders 110 via the orifices 108. In a refinement, the passages 106 may terminate at the orifices 108 in the first and/or second sheets 102, 104. In a variation, a first set of bladders may be fixed to the first sheet and a second set of bladders may be fixed to the second sheet. The bladders may be of various shapes and sizes. In one variation, there may be at least 2 different types of bladders, or more preferably at least 3 different types or bladders. For example, the first sheet 102 may define 1 to 20, or more preferably 5 to 15, or even more preferably 7 to 13 orifices 108 and the orifices may each be in fluid communication with a bladder. For example, rectangular bladders 120 may be connected to the first sheet 102. The second sheet 104 may define 1 to 20 orifices, or more preferably 4 to 12 orifices or even more preferably 6 to 10 orifices 108. Lumbar 122, shoulder support 123, bolster bladders 124 or a combination thereof may be connected to the second sheet 104. For example, the second sheet may include three lumbar bladders 122, one shoulder support bladder 123, and two bolster bladders 124.

The passages 106 each include a second end defining an aperture for receiving an airflow from a flow inducing device. A valve assembly may be disposed between the aperture and flow inducing device to provide selective fluid communication between the passages 106 and the flow inducing device. The passage 106 may each be connected to a portion of the valve assembly. For example, the passage 106 may be connected directly to the valve assembly such as by high frequency or ultrasonic welding. The flow inducing device may be, for example, a pump, a compressor, or a combination thereof. The flow inducing device may provide an airflow such that the passages and/or compartments are inflated when the corresponding valve is open and the flow inducing device is operating.

The sheets 102, 104 may also define a ventilation channel. The ventilation channel may be centrally located or proximate to the center of the first and second sheets 102, 104. A ventilation bag 126 may be disposed or housed in the ventilation channel. The ventilation bag 126 may define one or more ventilation or outlet orifices 128 to provide ventilation to an occupant 210 when in operation. The ventilation bag 126 may also define an inlet that receives an airflow from a flow inducing device such as blower or fan to ventilate an occupant 210 when in operation. In a variation, the first and second sheets 102, 104 may form a portion of the ventilation bag 126.

In another variation, the first sheet 102 may form a first portion of a first ventilation bag and the second sheet 104 may form a second portion of a second ventilation bag. The first ventilation bag may define one or more ventilation or outlet orifices 128 and a first aperture aligned with the ventilation channel. The first aperture may be defined by the first portion. The second ventilation bag may define a second aperture aligned with the first aperture and the ventilation channel such that the second bag is in fluid communication with the first bag through the apertures and ventilation channel. The second aperture may be defined by the second portion. The second bag may also define an inlet that may be connected to a flow inducing device such as a blower or fan 130 to receive a fluid flow. The inlet may be connected to the flow inducing device by, for example, a snap ring, adhesive, or high frequency or ultrasonic welding. During operation and when in fluid communication with a flow inducing device, ventilation may be provided to an occupant 210 from the flow inducing device, into the inlet, through the second ventilation bag, out the second aperture, into the first aperture, through the first ventilation bag, and out the one or more ventilation or outlet orifices to the occupant 210.

Figures 3A, 3B:
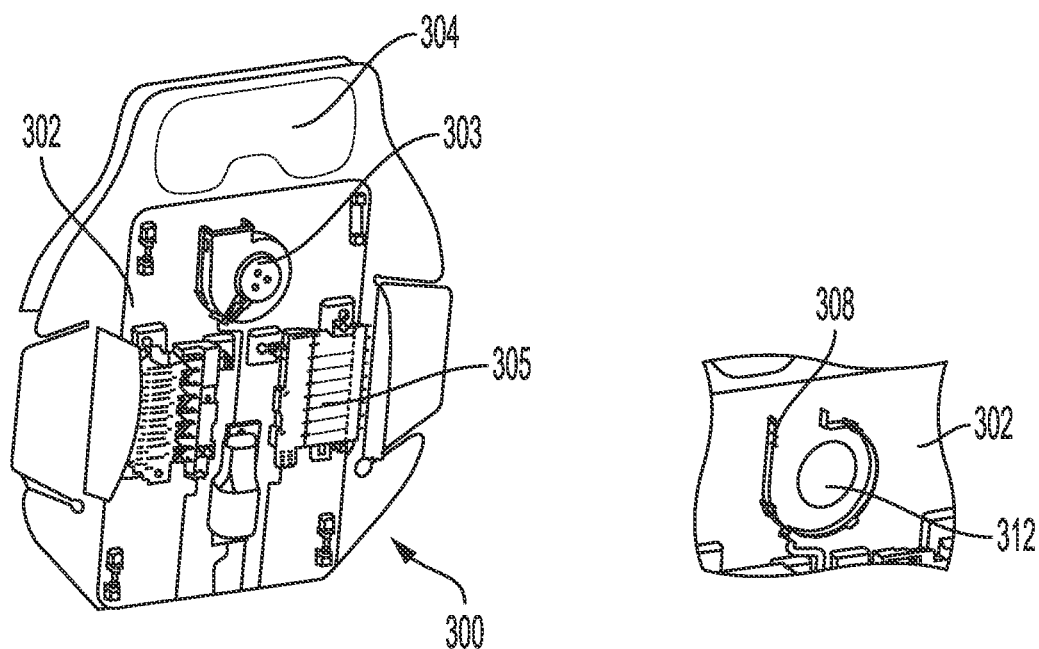
FIG. 3A is a support structure of a seat assembly with a blower and portion of a blower housing.
FIG. 3B is a portion of the support structure forming a portion of a blower housing with the blower removed.

Referring to FIG. 3A-B, another seat subassembly 300 is disclosed. The seat subassembly 300 may likewise be used in the seat assembly 200 and supported by the seat frame 201, as shown in FIG. 4. The seat subassembly 300 may include a support structure 302, one or more flow inducing devices 303, a valve assembly, an inflatable massage subassembly 304 such as those described herein, electronics 305, or a combination thereof.

The support structure 302 may be a carrier 302 and may include a first side 306 and a second side opposite the first side. In a refinement, the support structure 302 may be generally flat and rigid. For example, the support structure may be a board or resemble a board. The support structure 302 may be a rigid plastic such as polyethylene, polycarbonate, polyurethane, polyvinyl chloride, or a combination thereof. The thickness of the support structure 302 may be at least 0.5 mm, or more preferably at least 2 mm, or even more preferably at least 2.5 mm. In a refinement, the support structure 302 may have thickness of 0.5 to 20 mm, or more preferably 1 to 10 mm, or even more preferably 2 to 3.5 mm.

Figure 3C:
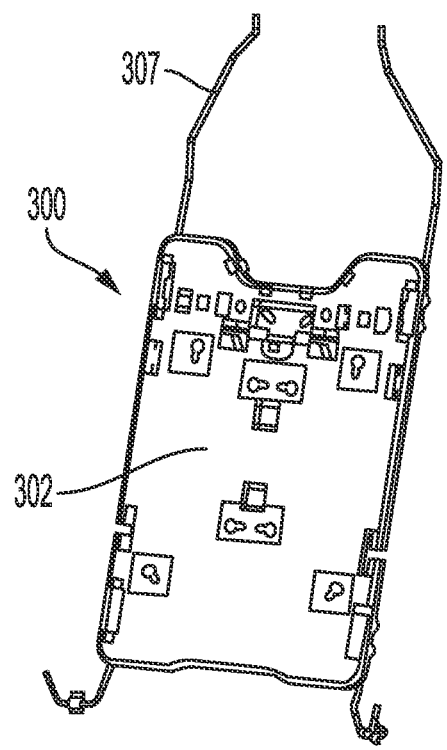
FIG. 3C is a support structure having a suspension system.

The support structure 302 may include a plurality of fasteners/retainers 308 for securing components such as the flow inducing devices 303, valve assemblies, inflatable subassemblies 304, electronics 305, or a combination thereof to the support structure 302. The support structure 302 may also include a suspension system 307 for securing it to the seat assembly 200, as shown in FIG. 3C. The suspension system 307 attaches to the frame 201 of the seat back assembly 200.

The support structures disclosed herein may be preassembled prior to being suspended in seat assemblies. The support structures may have the same or different configurations for attaching the components such that they are assembled for a for specific model but still have the same or substantially similar shape and size (e.g., same outer perimeter or profile). Each support structure 302 may be suspended in the seat assembly by a suspension system. The suspension system 307 may be different for each model. In other words, various support structures having different features may be preassembled. The preassembled support structures may then be suspended within various seat assemblies.

The plurality of fasteners/retainers 308 may connect one or more flow inducing devices 303 such a pump, a compressor, a blower 310, a fan or a combination thereof. The fasteners/retainers 308 may include a snap-fit/press-fit/interference-fit arrangements, screws, bolts, rivets, adhesive, ultrasonic welding, or any suitable fastener/retainer. Snap-fit arrangements rely on the flexibility of materials such as plastics for interlocking separate components. Snap-fits may be cantilever, torsional, and/or annular. In a variation, the retainer arrangements may include a first segment that is portion of the support structure and a second segment that is a portion of the attached component such as the blower. The first and second segments may interlock such that additional parts like bolts or screws, for example, are not necessary. This may reduce the material cost, and the time and complexity of assembling the assembly 200. In a refinement, the plurality of fasteners/retainers 308 may provide for connecting a blower 310 to the first side 306 of the support structure 302. The blower 310 may include a portion of a housing when combined with the support structure 302, the support structure may also form a portion of the housing. Said differently, the blower housing may be at least partially formed by the support structure 302. For example, the upper portion of the blower housing may be snap-fitted to the support structure 302 such that the lower portion of the blower housing is formed by the support structure 302. Using the support structure 302 to form a portion of the housing(s) may reduce material cost. The support structure 302 may also define a gap 312 such that the blower 310 can provide an airflow to a ventilation system/ventilation bag through the gap 312 during operation.

The plurality of fasteners/retainers 308 may, in combination or alternatively, allow a pump, compressor, fan or combination thereof to also be connected to the support structure 302. A pump or compressor, for example, may also be positioned such that it is in fluid communication with a valve assembly and/or massage subassembly that is likewise connected to the support structure 302 by the plurality of fasteners/retainers 308. In a variation, the massage subassembly 304 may be connected to and/or positioned on the second side of the support structure 302 opposite the blower, compressor, and pump. The support structure 302 may also form a portion of the pump/compressor housing as described above with regards to the blower housing. The pump/compressor may be positioned such that it is in fluid communication with the massage subassembly 304. The pump/compressor may be in fluid communication with the subassembly 304 via another gap defined by the support structure 302. The valve assembly may be positioned between the pump/compressor and the massage subassembly 304. The support structure 302 may similarly form a portion of the valve assembly housing. In a variation, the blower 310, compressor, pump, valve assembly, electronics 305 or a combination thereof such as the blower 310, pump and valve assembly may share a common housing and the support structure 302 may form a portion of the common housing.

In a refinement, the blower 310, pump/compressor, valve assembly, or a combination thereof may be positioned or connected to a first side of a support structure 302 and the massage subassembly 304 may be positioned or connected to a second side of the support structure 302 opposite the first side. The electronics 305 may also be secured to the support structure 302 via the plurality of fasteners/retainers 308. In a refinement, the electronics 305 may be secured to the first side 306. The electronics 305 may include, but are not limited to, circuits, printed circuit boards, current carrying mediums (i.e., IE harness) batteries, heating elements, motors, fuses, control electronics and logic controllers.

Figure 2:
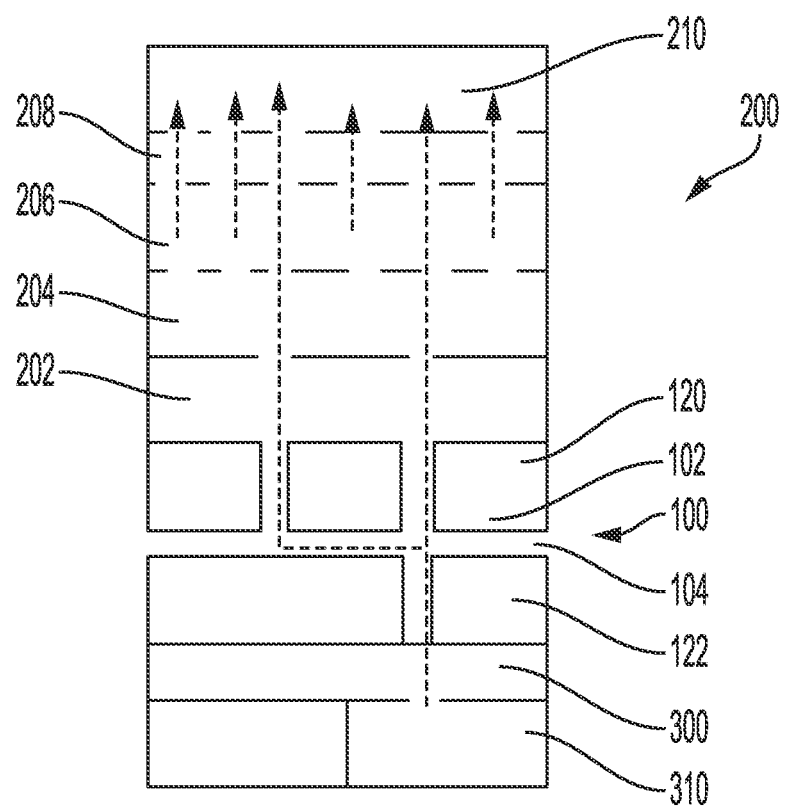
FIG. 2 is a schematic of a seat subassembly according to an embodiment.

The seat assembly 200 may also include a foam or cushion layer 202, a heater 204, a lamination layer 206, and a trim cover 208 enclosing the seat assembly 200 as shown in FIG. 2. These layers may be porous and/or include perforations such that the ventilation air may pass through to an occupant during operation.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A massage subassembly comprising:
a first sheet fixed to a second sheet such that the first and second sheets define a plurality of inflatable passages, each inflatable passage being in fluid communication with an inflatable compartment via an orifice in the first or second sheet, and each inflatable passage comprising a first end terminating at the orifice and a second end fluidly connectable with a fluid flow from a valve assembly or pump, each inflatable compartment being defined by a bladder; and
wherein the first sheet and the second sheet define at least one ventilation channel extending to a ventilation outlet, wherein the ventilation outlet comprises one or more ventilation outlet orifices, and including a ventilation bag associated with the at least one ventilation channel, wherein the ventilation bag defines one or more of the ventilation outlet orifices.

2. The massage subassembly of claim 1, wherein the bladder is formed by one or more additional sheets fixed to the first or second sheet.

3. A seat assembly comprising a seat frame, and the massage subassembly of claim 1 supported by the seat frame.

4. The massage subassembly of claim 1, wherein the massage subassembly is supported by a carrier panel that includes one or more suspension systems that suspend the carrier panel from a seat frame.

5. A massage subassembly comprising:
a first sheet fixed to a second sheet such that the first and second sheets define a plurality of inflatable passages, each inflatable passage being in fluid communication with an inflatable compartment via an orifice in the first or second sheet, and each inflatable passage comprising a first end terminating at the orifice and a second end fluidly connectable with a fluid flow from a valve assembly or pump, each inflatable compartment being defined by a bladder; and
wherein the first sheet and the second sheet define at least one ventilation channel extending to a ventilation outlet, wherein the ventilation outlet comprises one or more outlet orifices, and wherein the first sheet forms a first portion of a first ventilation bag and the second sheet forms a second portion of a second ventilation bag, the first ventilation bag defining one or more of the outlet orifices and the first portion defining a first aperture aligned with the at least one ventilation channel, the second ventilation bag with an inlet fluidly connectable to an airflow from a blower and the second portion defining a second aperture aligned with the first aperture such that ventilation flow from the blower flows through the second aperture of the second ventilation bag to the first aperture of the first ventilation bag and to the one or more outlet orifices.

6. A massage subassembly comprising:
a first sheet fixed to a second sheet such that the first and second sheets define a plurality of inflatable passages, each inflatable passage being in fluid communication with an inflatable compartment via an orifice in the first or second sheet, and each inflatable passage comprising a first end terminating at the orifice and a second end fluidly connectable with a fluid flow from a valve assembly or pump, each inflatable compartment being defined by a bladder; and
wherein the first sheet and the second sheet define at least one ventilation channel extending to a ventilation outlet, wherein the ventilation outlet comprises one or more outlet orifices, and wherein the at least one ventilation channel houses a ventilation bag having an inlet fluidly connectable to an airflow from a blower and one or more of the outlet orifices such that ventilation flow from the blower is directed through the ventilation bag and out of the one or more outlet orifices.

7. A vehicle seat subassembly comprising:
a support structure with a first side and a second side opposite the first side, wherein the support structure comprises a carrier panel that is suspendable from a seat structure, wherein the carrier panel includes an open gap extending through a thickness of the carrier panel;
a blower attached to the first side of the support structure, the blower comprising blower housing having a first housing portion that is securable to the support structure to cover the open gap such that a portion of the carrier panel surrounding the open gap forms a second housing portion of the blower and wherein the open gap comprises a ventilation flow outlet for the blower; and
an inflatable massage subassembly attached to the second side of the support structure.

8. The vehicle seat subassembly of claim 7, further comprising a pump attached to the support structure, the pump comprising a second housing and the pump being in fluid communication with the inflatable massage subassembly comprising one or more inflatable bladders, wherein the support structure forms a portion of the second housing.

9. The vehicle seat subassembly of claim 8, further comprising:
a valve assembly attached the support structure, the valve assembly comprising a third housing wherein the support structure forms a portion of the third housing.

10. The vehicle seat subassembly of claim 9, wherein a segment of each of the blower housing, the second housing, and the third housing is connected to the support structure by a retainer.

11. The vehicle seat subassembly of claim 7, further comprising a pump and a valve assembly within the first housing.

12. A vehicle seat assembly comprising a seat frame, and the vehicle seat subassembly of claim 7 is supported on the carrier panel by the seat structure which comprises the seat frame.

13. The vehicle seat subassembly of claim 7, wherein the seat structure comprises a seat frame, and wherein the carrier panel comprises one or more suspension systems that secure the carrier panel to the seat frame.

14. The vehicle seat subassembly of claim 7, wherein:
the inflatable massage subassembly is attached to the second side of the support structure such that the carrier panel, the blower, and the inflatable massage subassembly provide a pre-assembled support structure; and
a suspension system comprises a plurality of attachment members that extend outwardly of the carrier panel, wherein the plurality of attachment members attach the pre-assembled support structure to a frame of a seat back.

15. The vehicle seat subassembly of claim 14, wherein the plurality of attachment members comprise a first pair of attachment members extending upwardly from an upper edge of the carrier panel and a second pair of attachment members extending downwardly from a lower edge of the carrier panel.

16. A vehicle seat subassembly comprising:
a support structure with a first side and a second side opposite the first side, wherein the support structure comprises a carrier panel that is suspendable on a seat structure;
a blower attached to the first side of the support structure, the blower comprising a first housing having a ventilation flow outlet, wherein the support structure forms a portion of the first housing;
an inflatable massage subassembly attached to the second side of the support structure;
a pump attached to the support structure, the pump comprising a second housing and the pump being in fluid communication with the inflatable massage subassembly comprising one or more inflatable bladders, wherein the support structure forms a portion of the second housing;
a valve assembly attached the support structure, the valve assembly comprising a third housing wherein the support structure forms a portion of the third housing; and
wherein the one or more inflatable bladders each comprise a sidewall defining an inflatable compartment and at least a portion of the sidewall being a first sheet, the first sheet being connected to a second sheet to define a ventilation channel between the first sheet and the second sheet.

17. The vehicle seat subassembly of claim 16, wherein the support structure further comprises a plurality of suspension systems suspending the inflatable massage subassembly in a seat assembly.

18. A massage subassembly comprising:
a first sheet and a second sheet defining an inflatable air passage with a first end and a second end, the first end in fluid communication with an airflow through a valve assembly and the second end terminating at an orifice in the second sheet;
a third sheet defining an inflatable compartment attached to the second sheet around the orifice such that the inflatable air passage is in fluid communication with the inflatable compartment;
at least one ventilation channel defined by the first sheet and the second sheet, the at least one ventilation channel extending to a ventilation outlet, and wherein the ventilation outlet comprises one or more ventilation outlet orifices; and
a ventilation bag associated with the at least one ventilation channel, wherein the ventilation bag defines one or more of the ventilation outlet orifices.

19. A vehicle seat assembly comprising a seat frame, and the massage subassembly of claim 18 is supported by a carrier panel that is securable to the seat frame via a suspension system.

20. The massage subassembly of claim 18, further comprising a fourth sheet such that the third sheet and fourth sheets define an additional inflatable compartment.

21. The massage subassembly of claim 20, further comprising a fifth sheet such that the fourth and fifth sheets define an additional inflatable passage in fluid communication with the additional inflatable compartment via an additional orifice in the fourth sheet.

22. The massage subassembly of claim 18, wherein the inflatable air passage is one of a plurality of inflatable air passages defined by the first and second sheets, each inflatable air passage being in fluid communication with a corresponding compartment.

23. The massage subassembly of claim 22, wherein another inflatable air passage from the plurality of inflatable air passages is in fluid communication with a compartment defined by the first sheet and a fourth sheet via an additional orifice in the first sheet.

24. A vehicle seat subassembly comprising:
a support structure with a first side and a second side opposite the first side, wherein the support structure comprises a carrier panel that is suspendable from a seat structure;
a blower attached to the first side of the support structure, the blower comprising a first housing having a ventilation flow outlet, wherein the support structure forms a portion of the first housing; and
an inflatable massage subassembly attached to the second side of the support structure, wherein the inflatable massage subassembly comprises at least a first sheet and a second sheet defining a plurality of inflatable passages, with each inflatable passage being in fluid communication with at least one bladder, and wherein the first sheet and the second sheet define at least one ventilation channel associated with a ventilation bag that defines one or more ventilation outlet orifices.

* * * * *